US012670893B2

(12) United States Patent
Ise

(10) Patent No.: US 12,670,893 B2
(45) Date of Patent: Jun. 30, 2026

(54) AUDIO SIGNAL PROCESSING DEVICE AND REMOTE CONTROL SYSTEM

(71) Applicant: ALPS ALPINE CO., LTD., Tokyo (JP)

(72) Inventor: Tomohiko Ise, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 126 days.

(21) Appl. No.: 18/763,397

(22) Filed: Jul. 3, 2024

(65) Prior Publication Data

US 2025/0014559 A1 Jan. 9, 2025

(30) Foreign Application Priority Data

Jul. 7, 2023 (JP) ................................ 2023-112110

(51) Int. Cl.
*G10K 11/178* (2006.01)

(52) U.S. Cl.
CPC .. *G10K 11/17823* (2018.01); *G10K 11/17873* (2018.01); *G10K 2210/128* (2013.01); *G10K 2210/3027* (2013.01); *G10K 2210/3028* (2013.01); *G10K 2210/3055* (2013.01)

(58) Field of Classification Search
CPC ....... G10K 11/17823; G10K 11/17873; G10K 2210/128; G10K 2210/3027; G10K 2210/3055
USPC ........................................................ 381/71.4
See application file for complete search history.

(56) References Cited

U.S. PATENT DOCUMENTS

2018/0240452 A1* 8/2018 Every .................. G10K 11/178
2020/0082838 A1 3/2020 Hu et al.
2020/0118537 A1* 4/2020 Zhao ................ G10K 11/17823
2021/0020155 A1 1/2021 Seagriff et al.

FOREIGN PATENT DOCUMENTS

JP 4616529 1/2011
JP 6966750 11/2021

OTHER PUBLICATIONS

Extended European Search Report for EP24186294.5 mailed on Nov. 29, 2024.

* cited by examiner

*Primary Examiner* — Vivian C Chin
*Assistant Examiner* — Douglas J Suthers
(74) *Attorney, Agent, or Firm* — IPUSA, PLLC

(57) ABSTRACT

An audio signal processing device generates an output signal by alleviating a noise component in an input signal including both a sound component to be heard and the noise component. The audio signal processing device includes: a composite sound output part to output a composite sound signal; an adaptive filter to receive as an input the composite sound signal output from the composite sound output part; and a subtraction part to output an output sound signal by subtracting an output signal of the adaptive filter from an input sound signal. The adaptive filter performs adaptation operation assuming that the output sound signal from the subtraction part is an error. The composite sound signal from the composite sound output part is formed with pure tones of multiple frequencies extracted from a frequency band that is to be cancelled and that includes a frequency band of the alleviated noise component.

9 Claims, 8 Drawing Sheets

AUDIO SIGNAL PROCESSING DEVICE AND REMOTE CONTROL SYSTEM

CROSS-REFERENCE TO RELATED APPLICATION

The present application claims priority under 35 U.S.C. § 119 to Japanese Patent Application No. 2023-112110, filed Jul. 7, 2023, the contents of which are incorporated herein by reference in their entirety.

BACKGROUND OF THE INVENTION

Field of the Invention

The present disclosure relates to a technique for reducing the level of unknown noise components contained in audio signals.

Description of the Related Art

There are techniques for reducing the level of unknown noise components contained in an audio signal. For example, there is a technique known for its use of blind audio source separation, which separates individual sound source signals forming a composite signal, which is a mixture of multiple sound source signals, taking advantage of the fact that each sound source signal is a separate signal, thereby canceling unknown noise components contained in an audio signal (see, for example, patent documents 1 and 2).

This technique uses multiple microphones to collect sound in a noisy environment where the sound to be heard is produced, evaluates the correlation between audio signals output by respective microphones, and extracts only the audio components to be heard.

RELATED-ART DOCUMENT

Patent Document

[Patent Document 1] Japanese Patent No. 6966750
[Patent Document 2] Japanese Patent No. 4616529

SUMMARY OF THE INVENTION

Problem to be Solved by the Invention

The above-described technique of canceling unknown noise components using blind audio source separation requires that many microphones be positioned, and therefore the technique cannot be used if space for placing a large number of microphones cannot be secured in the environment where the sound to be heard is produced. Also, even if space for positioning many microphones can be secured, positioning many microphones necessitates troublesome work and increased costs.

The present disclosure therefore aims to reduce the level of unknown noise components contained in audio signals using a relatively simple structure.

Means for Solving the Problem

In order to achieve the above objective, the present invention provides an audio signal processing device for generating an output signal by alleviating a noise component in an input signal that includes both a sound component to be heard and the noise component. The audio signal processing device includes: a composite sound output part configured to output a composite sound signal; an adaptive filter configured to receive as an input the composite sound signal output from the composite sound output part; and a subtraction part configured to output an output sound signal by subtracting an output signal of the adaptive filter from an input sound signal. The adaptive filter is configured to perform an adaptation operation assuming that the output sound signal output from the subtraction part is an error. The composite sound signal output from the composite sound output part is formed with pure tones of a plurality of frequencies extracted from a frequency band that is to be cancelled and that includes a frequency band of the noise component alleviated in the audio signal processing device.

In this audio signal processing device, the composite sound signal output from the composite sound output part may be formed with the pure tones of the plurality of frequencies extracted from the frequency band to be cancelled at predetermined frequency intervals.

Furthermore, in this signal processing device, the composite sound output part may include: an information storage part configured to store frequency-domain information of the composite sound signal to be output; and a conversion part configured to convert the frequency-domain information stored in the information storage part into the composite sound signal.

Furthermore, in this signal processing device, the frequency-domain information of the composite sound signal may be a Fourier coefficient, and the conversion part may be configured to convert the frequency-domain information into the composite sound signal using an inverse fast Fourier transform.

Furthermore, in this audio signal processing device, the frequency-domain information of the composite sound signal may be a wavelet transform coefficient, and the conversion part may be configured to convert the frequency-domain information into the composite sound signal using an inverse wavelet transform.

Furthermore, in order to achieve the above objective, the present invention also provides an audio signal processing device for generating an output signal by alleviating a noise component in an input signal including both a sound component to be heard and the noise component. The audio signal processing device includes: a first conversion part configured to convert an input sound signal into first information, the first information being frequency-domain information of the input sound signal; an information storage part configured to store second information, the second information being frequency-domain information of a composite sound signal formed with pure tones of a plurality of frequencies extracted from a frequency band that is to be cancelled and that includes a frequency band of the noise component alleviated in the audio signal processing device; an adaptive filter configured to receive the second information as an input and output third information, the third information being frequency-domain information of a noise-canceling sound; a subtraction part configured to output fourth information, the fourth information being frequency-domain information obtained by subtracting the third information from the first information; and a second conversion part configured to convert the fourth information into a sound signal and output the sound signal as an output sound signal. The adaptive filter is configured to perform an adaptation operation assuming that the fourth information is an error.

In this audio signal processing device, the composite sound signal may be formed with the pure tones of the plurality of frequencies extracted at predetermined frequency intervals from the frequency band to be cancelled.

Furthermore, in this audio signal processing device, the frequency-domain information may be a Fourier coefficient, the first conversion part may be configured to convert the input sound signal into the first information by performing a fast Fourier transform, and the second conversion part may be configured to convert the fourth information into the output sound signal by performing an inverse fast Fourier transform.

Furthermore, in this audio signal processing device, the frequency-domain information may be a wavelet transform coefficient, the first conversion part may be configured to convert the input sound signal into the first information by performing a wavelet transform, and the second conversion part may be configured to convert the fourth information into the output sound signal by performing an inverse wavelet transform.

In addition, the present invention provides a remote control system including the above audio signal processing device. This remote control system includes: a vehicle system installed in a vehicle; and a control system configured to control the vehicle remotely. The vehicle system includes: a microphone configured to pick up a sound in which a sound to be heard and noise are mixed, and output a monitoring sound signal; and a transmission part configured to transmit the monitoring sound signal output from the microphone to the control system. The control system includes: a receiving part configured to receive the monitoring sound signal from the vehicle system; a speaker; and the audio signal processing device. The monitoring sound signal received by the receiving part is input to the audio signal processing device as the input sound signal, and the output sound signal is output from the audio signal processing device to the speaker.

According to the above-described audio signal processing device, the level of unknown noise components contained in an input sound signal can be reduced, and the resulting input signal can be output as an output sound signal, by using a simple structure that does not require multiple microphones.

Advantageous Effects of the Invention

As described above, according to the present disclosure, it is possible to reduce the level of unknown noise components contained in audio signals by using a relatively simple structure.

DETAILED DESCRIPTION OF THE DISCLOSURE

Figure 1:
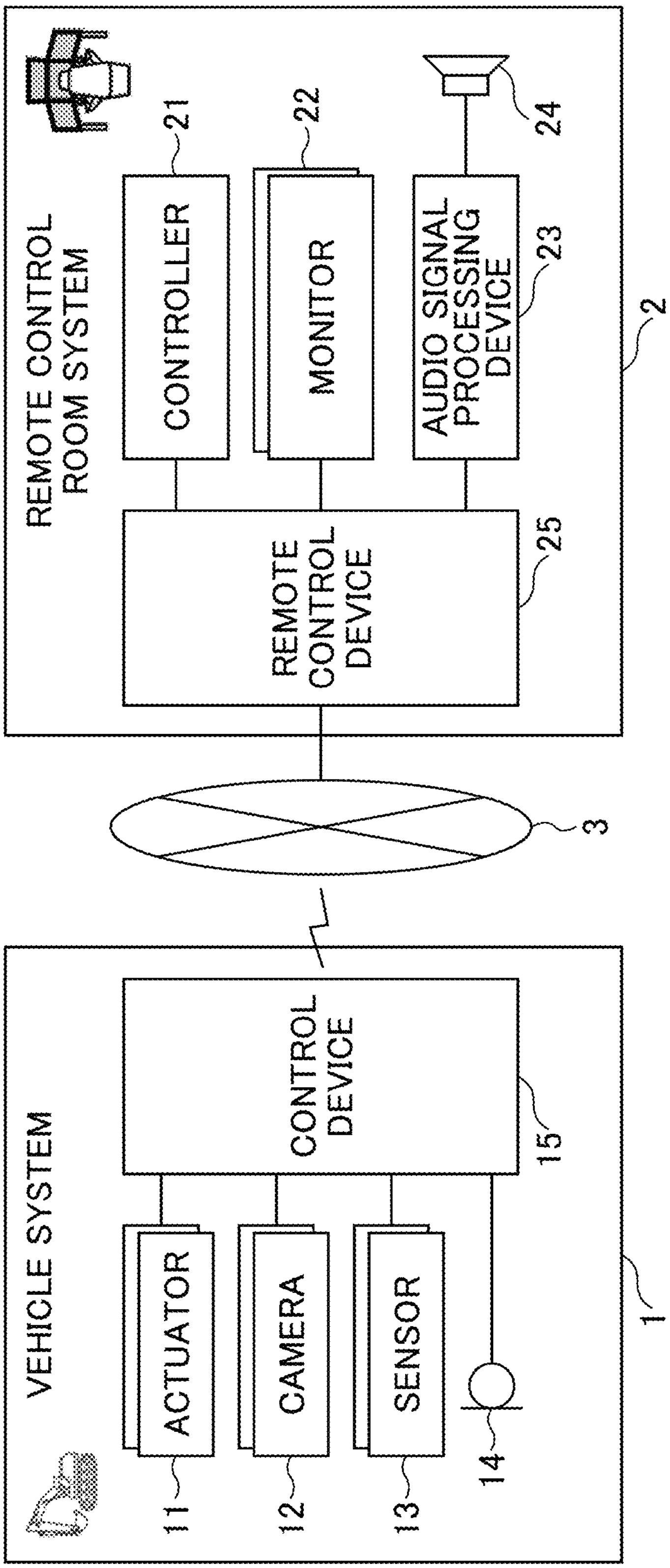
FIG. 1 is a block diagram showing a structure of a remote control system according to a first embodiment of the present disclosure.

Now, embodiments of the present disclosure will be described below with reference to examples in which the present disclosure is applied to a remote control system. The first one of the embodiments will be described. FIG. 1 shows a structure of a remote control system according to the first embodiment. The remote control system is a system for remotely controlling construction vehicles such as heavy machinery. The remote control system includes, for example, a vehicle system 1 mounted on a construction vehicle, and a remote control room system 2 installed in a remote control room. The vehicle system 1 includes: actuators 11 for controlling the operation of the construction vehicle; cameras 12 for photographing the surroundings and the inside of the vehicle; sensors 13 for detecting the conditions of the construction vehicle and the surroundings; a microphone 14 that picks up a mixture of sounds to be heard such as operation and warning sounds, and noise such as engine noise; and a control device 15.

The control device 15 transmits the images captured by the cameras 12, the conditions detected by the sensors 13, and audio signals picked up by the microphone 14, to the remote control room system 2 via the network 3. The control device 15 also drives the actuators 11 in accordance with control signals received from the remote control room system 2 to operate the construction vehicle.

On the other hand, the remote control room system 2 includes a controller 21, monitors 22, an audio signal processing device 23, a speaker 24, and a remote control device 25. The remote control device 25 controls the operation of the construction vehicle by transmitting control signals in accordance with the operator's operation received by the controller 21, to the vehicle system 1, via the network 3. In addition, the remote control device 25 displays the images and conditions received from the vehicle system 1 via the network 3 on the monitor 22, and outputs the audio signals received from the vehicle system 1 via the network 3 to the audio signal processing device 23.

Figure 2:
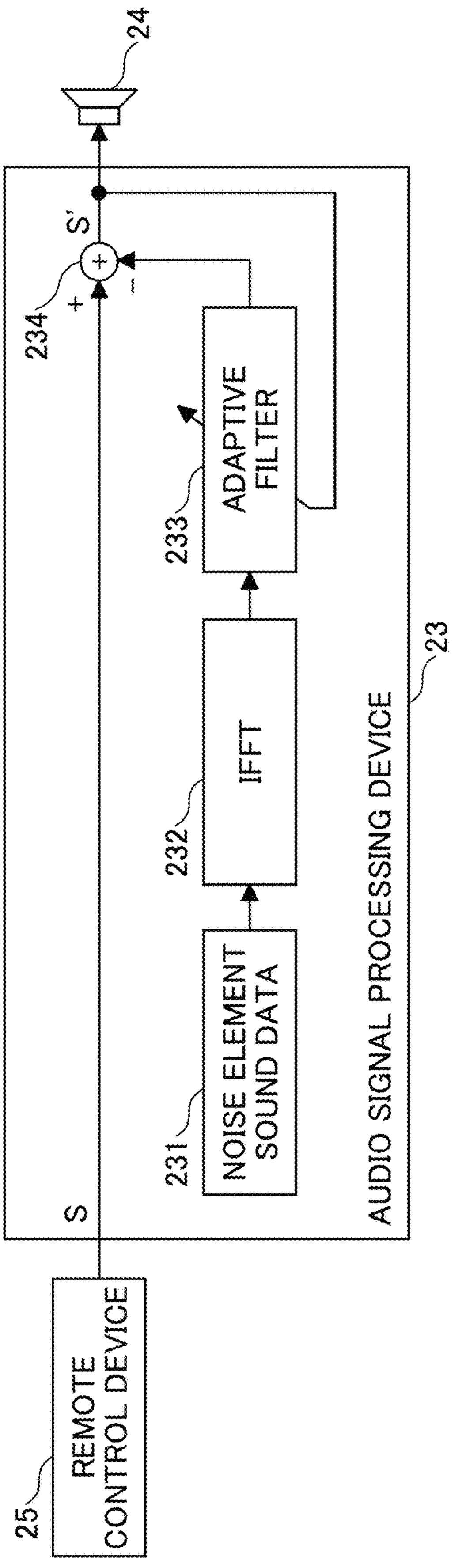
FIG. 2 is a block diagram showing a structure of an audio signal processing device according to the first embodiment of the present disclosure.

The audio signal processing device 23 then performs signal processing on the audio signals output from the remote control device 25, to alleviate the noise components, and outputs the resulting signals to the speaker 24. The audio signal processing device 23 will be described below. FIG. 2 shows a structure of the audio signal processing device 23. As illustrated in FIG. 2, the audio signal processing device 23 includes: noise element sound data 231; an IFFT 232 that performs an inverse fast Fourier transform; an adaptive filter 233; and a subtractor 234 that subtracts an output of the adaptive filter 233 from an audio signal S received as an input from the remote control device 25, thus deriving and sending an output signal S' to the speaker 24.

The noise element sound data 231 contains Fourier coefficients. The IFFT 232 performs an inverse fast Fourier transform on the Fourier coefficients, producing and outputting a reference sound to the adaptive filter 233. The adaptive filter 233 filters the input reference sound and outputs a noise-canceling sound to the subtractor 234. Also, assuming that the output signal S' from the subtractor 234 is an error, the adaptive filter 233 optimizes the filter coefficients (transfer function, tap coefficients, etc.) for the filtering of the reference sound by using adaptive algorithms such as LMS, NLMS and so forth, such that the error is minimized.

Now, the Fourier coefficients contained in the noise element sound data 231 represent a composite sound of multiple frequencies' pure tones, extracted at predetermined frequency intervals from a predetermined frequency band that serves as a frequency band to be cancelled, represented by using frequency-domain information. That is, the Fourier coefficients contained in the noise element sound data 231 are determined such that the reference sound having undergone the inverse fast Fourier transform at the IFFT 23 becomes a composite sound of multiple frequencies' pure tones extracted from the frequency band to be cancelled at predetermined frequency intervals. Therefore, the noise element sound data 231 and the IFFT 232 function as a sound source device that outputs the above composite sound of pure tones. Also, the Fourier coefficients contained in the noise element sound data 231 are the same or substantially the same as F(ω), calculated by the following mathematical formula 1, where f(t) is the composite sound. Note that the Fourier coefficients F(ω) contained in the noise element sound data 231, once subjected to an inverse fast Fourier transform based on, for example, the following equation 2, give a sound f(t), which serves as a reference sound.

$$F(\omega) = \frac{1}{\sqrt{2\pi}} \int_{-\infty}^{\infty} f(t) e^{-j\omega t}\, dt \qquad \text{(Mathematical formula 1)}$$

$$f(t) = \frac{1}{\sqrt{2\pi}} \int_{-\infty}^{\infty} F(\omega) e^{j\omega t}\, d\omega \qquad \text{(Mathematical formula 2)}$$

Figure 3:
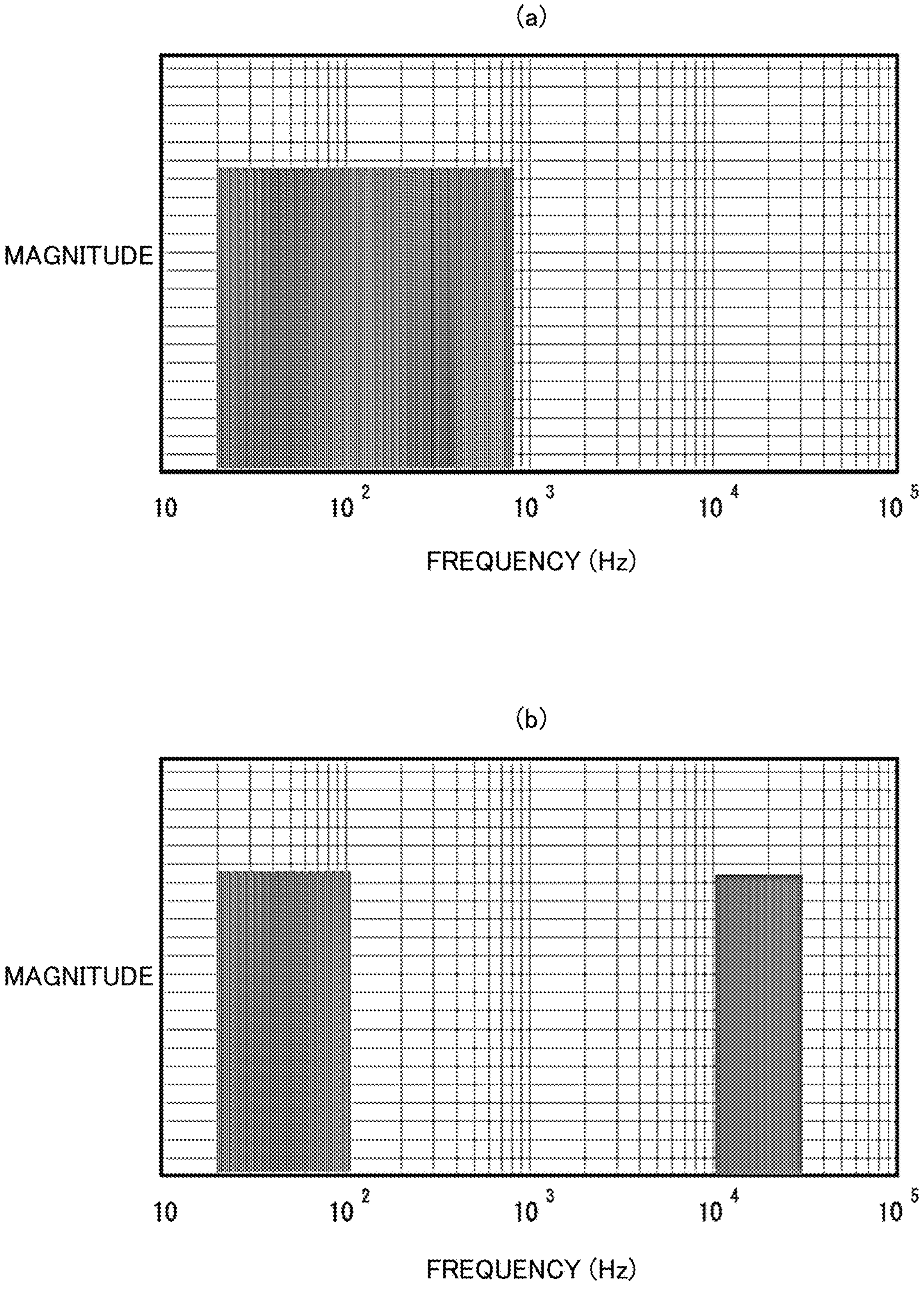
FIG. 3 shows schematic views of reference sound data according to the first embodiment of the present disclosure.
Figure 4:
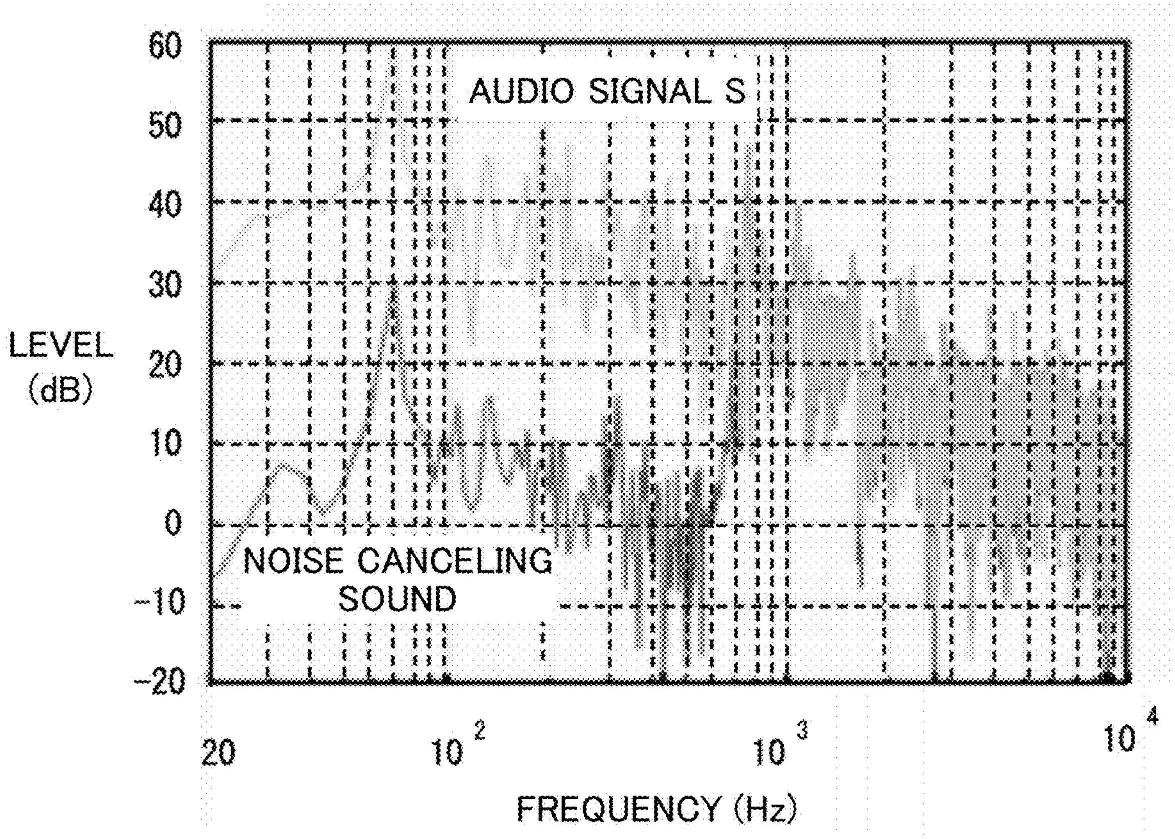
FIG. 4 is a diagram showing an example of noise-canceling sound according to the first embodiment of the present disclosure.

The values of Fourier coefficients associated with respective frequencies per pure tone, that is, the pure tones sampled at respective frequencies and formed into the composite sound, are all in magnitude (amplitude and power). However, the magnitude may vary per frequency as well. The frequency band to be cancelled is set such that frequency bands where the sound components to be heard contained in the audio signal S are mainly found are not included, and frequency bands where noise components are likely to be found are included. For example, assuming that engine noise provides noise components, as shown by the frequency spectrum of a composite sound shown in (a) of FIG. 3, low-order harmonics are also taken into account, and the frequency range from 20 Hz to 800 Hz is set as the frequency band to be cancelled. The frequency interval between pure tones is 5 Hz. Note that the frequency band to be cancelled does not necessarily have to be 20 Hz to 800 Hz, and other frequency bands such as the range from 20 Hz to 1 kHz may be used. Also, multiple frequency bands to be cancelled may be set, as illustrated in (b) of FIG. 3, where two frequency bands to be cancelled are configured. According to this audio signal processing device 23, the noise-canceling sound and the audio signal S are output from the adaptive filter 233 using adaptive filter coefficients, so that each frequency in the frequency band to be cancelled has a frequency component that is the same or substantially the same in magnitude. Consequently, when the band from 20 Hz to 1 kHz is set as the frequency band to be cancelled as shown in FIG. 4, the noise-canceling sound's components are the same or substantially the same as components contained in the audio signal S. As a result of this, the output signal S' that is sent from the subtractor 234 to the speaker 24 is one in which the level of noise components in the audio signal S is alleviated.

On the other hand, there is no significant impact on frequency bands other than the frequency band to be cancelled in the audio signal S. Consequently, the sound components of the audio signal S that are to be heard are included in the output signal S' with no appreciable attenuation, so that the operator can hear the sound output from the speaker 24 well.

Figure 5:
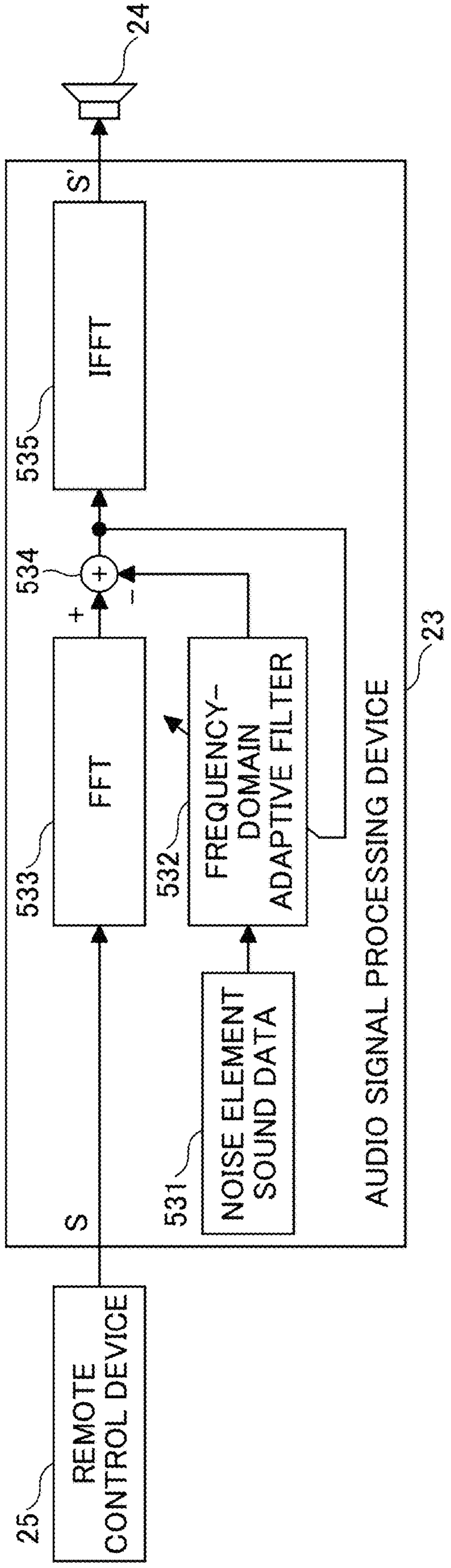
FIG. 5 is a block diagram showing another structure of an audio signal processing device according to a second embodiment of the present disclosure.

The first embodiment of the present disclosure has been described above. Next, a second embodiment of the present disclosure will be described. In the second embodiment, signal processing that is the same or substantially the same in effect as the operation of the audio signal processing device 23 of the first embodiment is performed in the frequency domain, except that the audio signal processing device 23 is structured differently. FIG. 5 shows a structure of the audio signal processing device 23 according to the second embodiment. As illustrated in this drawing, the audio signal processing device 23 according to the second embodiment includes noise element sound data 531, a frequency-domain adaptive filter 532, an FFT 533, a subtractor 534, and an IFFT 535. The noise element sound data 531 contains the same Fourier coefficients as those of the noise element sound data 231 of the first embodiment. The FFT 533 performs a fast Fourier transform on the audio signal S received as an input from the remote control device 25, and outputs the Fourier coefficients, which are frequency-domain information to represent the audio signal S, to the subtractor 534. The subtractor 534 subtracts the Fourier coefficients output from the frequency-domain adaptive filter 532, from the Fourier coefficients input from the FFT 533, on a per frequency basis, and outputs the resulting Fourier coefficients to the frequency-domain adaptive filter 532 and the IFFT 535. The IFFT 535 performs an inverse fast Fourier transform on the Fourier coefficients output from the subtractor 534, thus deriving and sending an output signal S' to the speaker 24. The frequency-domain adaptive filter 532 filters the Fourier coefficients contained in the noise element sound data 531, and outputs the results to the subtractor 534. Also, assuming that the Fourier coefficients output from the subtractor 534 are errors, the frequency-domain adaptive filter 532 optimizes the filter coefficients for the filtering of the Fourier coefficients contained in the noise element sound data 531 by using adaptive algorithms such as LMS, NLMS and so forth, such that the error is minimized.

According to the second embodiment, signal processing that is the same or substantially the same in effect as the operation of the audio signal processing device 23 of the first embodiment can be performed in the frequency domain. Accordingly, as in the first embodiment, it is possible to produce an audio signal S', in which the level of the noise components of the audio signal S substantially alone is alleviated, and produce the output signal S' from the speaker 24.

Figure 6:
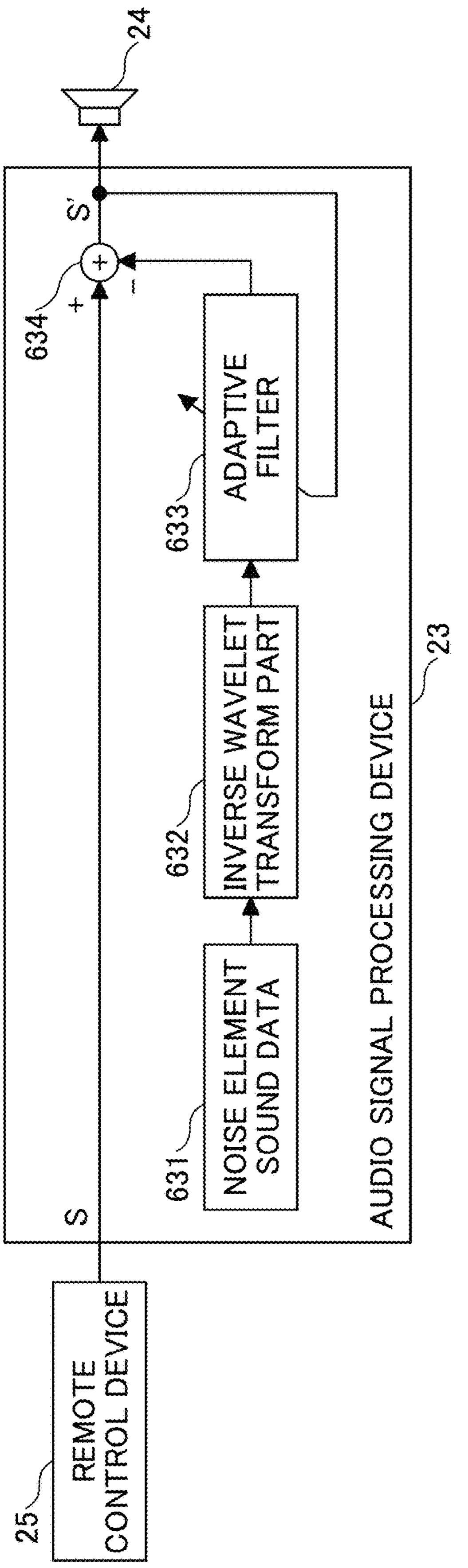
FIG. 6 is a block diagram showing another structure of an audio signal processing device according to a third embodiment of the present disclosure.

A third embodiment of the present disclosure will be described below. In the third embodiment, signal processing that is the same or substantially the same in effect as the operation of the audio signal processing device 23 of the first embodiment is performed using the wavelet transform instead of the Fourier transform, and only the audio signal processing device 23 is structured differently. FIG. 6 shows a structure of the audio signal processing device 23 according to the third embodiment. As illustrated in this drawing, the audio signal processing device 23 includes: noise element sound data 631; an Inverse wavelet transform part 632; an adaptive filter 633; and a subtractor 634 that subtracts an output of the adaptive filter 633, from an audio signal S received as an input from the remote control device 25, thereby deriving and sending an output signal S' to a speaker 24.

The noise element sound data 631 contains wavelet transform coefficients. The inverse wavelet transform part 632 performs an inverse wavelet transform on the wavelet transform coefficients, producing and outputting a reference sound to the adaptive filter 633. The adaptive filter 633 filters the input reference sound and outputs the resulting sound to the subtractor 634. Also, assuming that the output signal S' from the subtractor 634 is an error, the adaptive filter 633 optimizes the filter coefficients for the filtering of the reference sound by using adaptive algorithms such as LMS, NLMS and so forth, such that the error is minimized.

Now, as in the first embodiment, the wavelet transform coefficients contained in the noise element sound data 631 represent a composite sound of multiple frequencies' pure tones, extracted at predetermined frequency intervals from the frequency band to be cancelled, represented by using frequency-domain information. Therefore, the noise element sound data 631 and the inverse wavelet transform part 632 function as a sound source device that outputs the above composite sound of pure tones. Here, the wavelet transform can gain both frequency-domain information and time-domain information. However, the wavelet transform coefficients contained in the noise element sound data 631 do not represent changes over time; the magnitude of pure tone components contained in the reference sound and associated with respective frequencies therefore does not change over time.

The wavelet transform coefficients contained in the noise element sound data 631 are the same or substantially the same as T(a, b), which is calculated by, for example, the following mathematical formula 3, where f(t) is the composite sound. In the following mathematical formula, a is a scale parameter, b is a shift parameter, $\Psi_{a,b}$ is a wavelet with scale a and shift b, and * is the complex conjugate. Note that the wavelet transform coefficients T(a, b) contained in the noise element sound data 631, once subjected to the inverse wavelet transformation based on, for example, the following equation 4, give a sound f(t), which serves as a reference sound. $C_\Psi$ in the following mathematical formula is a constant determined for the type of the mother wavelet.

$$T(a, b) = \int_{-\infty}^{\infty} f(t)\psi_{a,b}^{*}(t)dt \quad \text{(Mathematical formula 3)}$$

$$f(t) = \frac{1}{C_\psi}\int_0^{\infty}\int_{-\infty}^{\infty} T(a, b)\psi_{a,b}(t)db\frac{da}{a^2} \quad \text{(Mathematical formula 4)}$$

According to the third embodiment, signal processing that is the same or substantially the same in effect as the operation of the audio signal processing device 23 of the first embodiment can be performed using the wavelet transform instead of the Fourier transform. Accordingly, as in the first embodiment, it is possible to produce an audio signal S', in which the level of substantially the noise components of the audio signal S alone is alleviated, and produce the output signal S' from the speaker 24.

Figure 7:
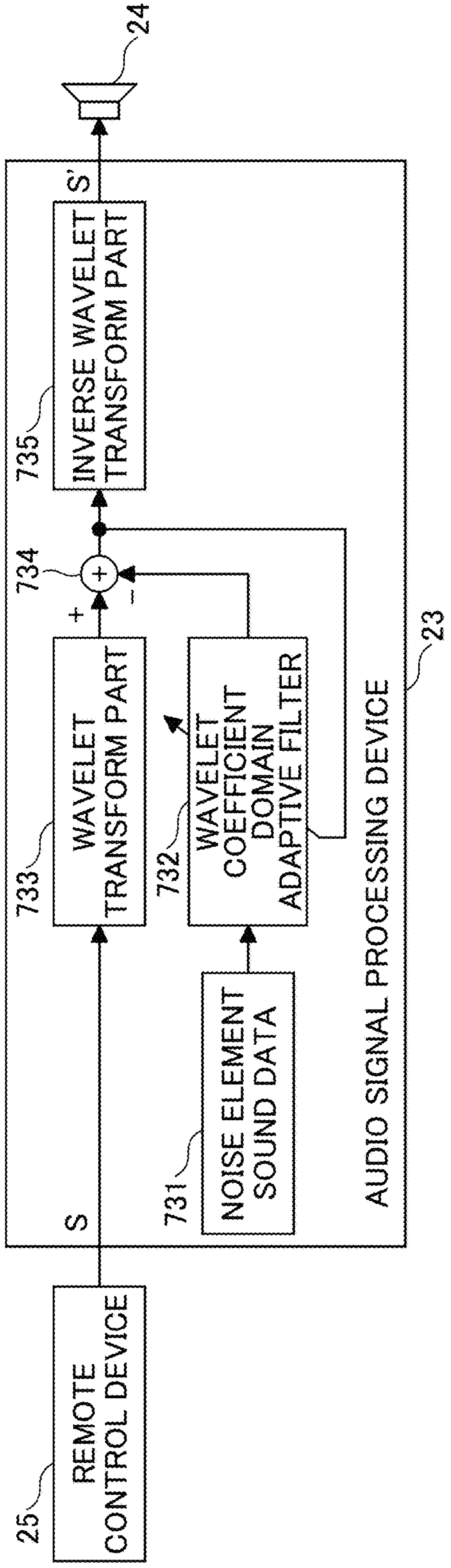
FIG. 7 is a block diagram showing another structure of an audio signal processing device according to a fourth embodiment of the present disclosure.

Next, a fourth embodiment of the present disclosure will be described. The fourth embodiment performs signal processing in the wavelet coefficient domain that is the same or substantially the same in effect as the operation of the audio signal processing device 23 of the third embodiment, and only the audio signal processing device 23 is structured differently. FIG. 7 shows a structure of the audio signal processing device 23 according to the fourth embodiment. As illustrated in this drawing, the audio signal processing device 23 according to the fourth embodiment includes: noise element sound data 731; a wavelet coefficient domain adaptive filter 732; a wavelet transform part 733; a subtractor 734; and an inverse wavelet transform part 735. The noise element sound data 731 contains the same wavelet transform coefficients as those of the noise element sound data 631 of the third embodiment. The wavelet transform part 733 performs a wavelet transform on the audio signal S received as an input from the remote control device 25, and outputs the wavelet transform coefficients, which are frequency-domain information to represent the audio signal S, to the subtractor 734. The subtractor 734 subtracts the wavelet transform coefficient output by the wavelet coefficient domain adaptive filter 732 from the wavelet transform coefficient input from the wavelet transform part 733, on a per wavelet basis, and outputs the resulting wavelet coefficients to the wavelet coefficient domain adaptive filter 732 and the inverse wavelet transform part 735.

The inverse wavelet transform part 735 performs an inverse wavelet transform on the wavelet transform coefficients output from the subtractor 734, thus deriving and sending an output signal S' to the speaker 24. The wavelet coefficient domain adaptive filter 732 filters the wavelet transform coefficients contained in the noise element sound data 731 and outputs the results to the subtractor 734. Also, assuming that the wavelet transform coefficients output from the subtractor 734 are errors, the wavelet coefficient domain adaptive filter 732 optimizes the filter coefficients for the filtering of the wavelet transform coefficients contained in the noise element sound data 731 by using adaptive algorithms such as LMS, NLMS and so forth, such that the error is minimized.

According to the fourth embodiment, signal processing that is the same or substantially the same in effect as the operation of the audio signal processing device 23 of the third embodiment can be performed in the wavelet coefficient domain. Accordingly, as in the third embodiment, it is possible to produce an audio signal S', in which the level of substantially the noise components of the audio signal S alone is alleviated, and produce the output signal S' from the speaker 24.

Figure 8:
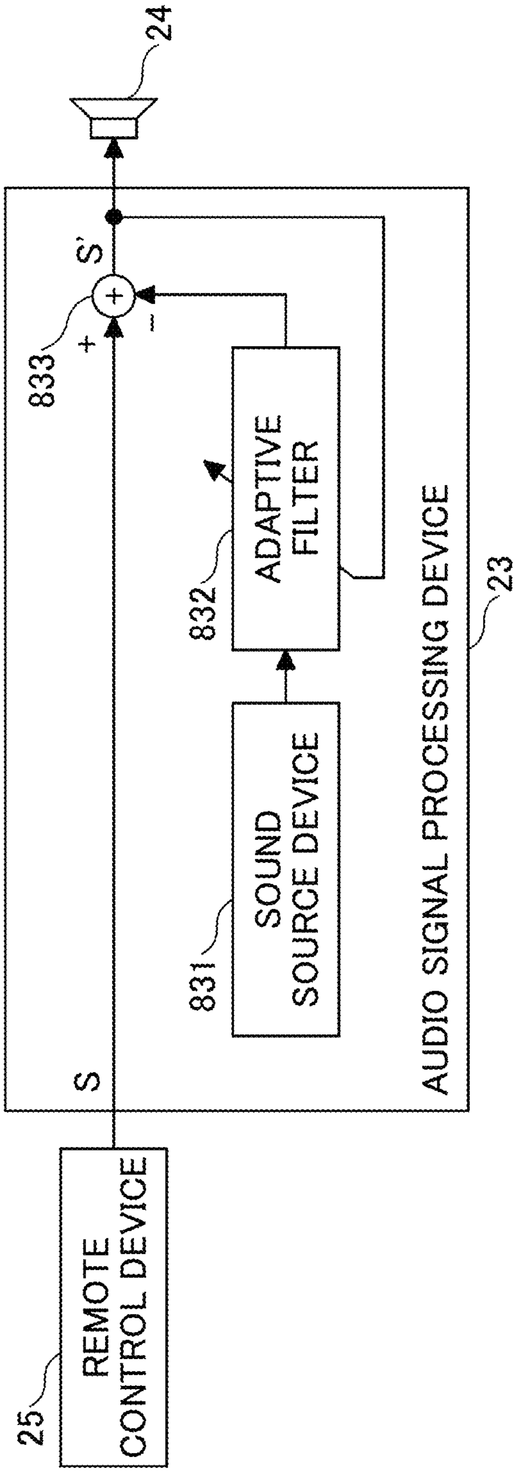
FIG. 8 is a block diagram showing another structure of an audio signal processing device according to a fifth embodiment of the present disclosure.

Next, a fifth embodiment of the present disclosure will be described. The fifth embodiment performs signal processing that is the same or substantially the same in effect as the operation of the audio signal processing device 23 of the first embodiment without using the Fourier transform, and only the audio signal processing device 23 is structured differently. FIG. 8 shows a structure of the audio signal processing device 23 according to the fifth embodiment. As illustrated in this drawing, the audio signal processing device 23 includes: a sound source device 831 in which audio data of the above-described composite sound of multiple frequencies' pure tones extracted at predetermined frequency intervals from the frequency band to be cancelled is set; an adaptive filter 832; and a subtractor 833 that subtracts an output of the adaptive filter 832, from an audio signal S received as an input from the remote control device 25, and outputs a signal S' to the speaker 24.

The sound source device 831 regenerates the audio data set therein and outputs a reference sound to the adaptive filter 832. The adaptive filter 832 filters the input reference sound and outputs the result to the subtractor 833. Also, assuming that the output signal S' from the subtractor 833 is an error, the adaptive filter 832 optimizes the filter coefficients for the filtering of the reference sound by using adaptive algorithms such as LMS, NLMS and so forth, such that the error is minimized.

According to the fifth embodiment, signal processing that is the same or substantially the same in effect as the operation of the audio signal processing device 23 of the first embodiment can be performed without using the Fourier transform. Accordingly, as in the third embodiment, it is possible to produce an audio signal S', in which the level of substantially the noise components of the audio signal S alone is alleviated, and produce the output signal S' from the speaker 24.

Embodiments of the present disclosure have been described above. As described above, according to each embodiment, unknown noise components contained in an audio signal S can be alleviated and the resulting output signal S' can be output using a simple structure that does not require multiple microphones. While examples of application to a remote control system have been shown hereinabove, each of the above embodiments can be used in any system to alleviate the level of noise components from a mixture of sounds to be heard and noise picked up by microphones 14. For example, if the embodiments described above are applied to an online conference system, it will be possible, for example, to alleviate the level of noise contained in the sound received from a participant attending an online conference from inside a vehicle by using his/her mobile terminal or the like, and output the resulting improved sound to the speakers 24 of other participants' terminals, without relying on the noise cancellation function of the mobile terminals.

What is claimed is:

1. A remote control system comprising:

an audio signal processing device for generating an output sound signal by alleviating a noise component in an input sound signal that includes both a sound component to be heard and the noise component, the audio signal processing device comprising:

a sound source device configured to output a composite sound signal;

an adaptive filter configured to receive as an input the composite sound signal output from the sound source device to output an adapted output signal; and a subtractor configured to output the output sound signal by subtracting the adapted output signal of the adaptive filter from the input sound signal, wherein the adaptive filter configured to perform an adaptation operation assuming that the output sound signal output from the subtractor is an error, and wherein the composite sound signal output from the sound source device is formed with pure tones of a plurality of frequencies extracted from a frequency band that is to be cancelled and that includes a frequency band of the noise component alleviated in the audio signal processing device, wherein the remote control system further comprises:

a vehicle system installed in a vehicle; and a control system configured to control the vehicle remotely, wherein the vehicle system includes:

a microphone configured to pick up a sound in which a sound to be heard and noise are mixed, and output a monitoring sound signal; and a transmitter configured to transmit the monitoring sound signal output from the microphone to the control system, wherein the control system includes:

a receiver configured to receive the monitoring sound signal from the vehicle system;

a speaker; and the audio signal processing device, and wherein the monitoring sound signal received by the receiver is input to the audio signal processing device as the input sound signal, and the output sound signal is output from the audio signal processing device to the speaker.

2. The remote control system according to claim 1, wherein the composite sound signal output from the sound source device is formed with the pure tones of the plurality of frequencies extracted from the frequency band to be cancelled at predetermined frequency intervals.

3. The remote control system according to claim 1, further comprising:

a storage device configured to store frequency-domain information of the composite sound signal to be output; and a conversion circuit configured to convert the frequency-domain information stored in the storage device into the composite sound signal.

4. The remote control system according to claim 3, wherein the frequency-domain information of the composite sound signal is a Fourier coefficient, and wherein the conversion circuit is an inverse fast Fourier transform circuit configured to convert the frequency-domain information into the composite sound signal using an inverse fast Fourier transform.

5. The remote control system according to claim 3, wherein the frequency-domain information of the composite sound signal is a wavelet transform coefficient, and wherein the conversion circuit is an inverse wavelet transform circuit configured to convert the frequency-domain information into the composite sound signal using an inverse wavelet transform.

6. A remote control system comprising:

an audio signal processing device for generating an output sound signal by alleviating a noise component in an input sound signal including both a sound component to be heard and the noise component, the audio signal processing device comprising:

a first conversion circuit configured to convert the input sound signal into first information, the first information being frequency-domain information of the input sound signal;

a storage device configured to store second information, the second information being frequency-domain information of a composite sound signal formed with pure tones of a plurality of frequencies extracted from a frequency band that is to be cancelled and that includes a frequency band of the noise component alleviated in the audio signal processing device;

an adaptive filter configured to receive the second information as an input and output third information as an adapted output signal, the third information being frequency-domain information of a noise-canceling sound;

a subtractor configured to output fourth information, the fourth information being frequency-domain information obtained by subtracting the third information from the first information; and a second conversion circuit configured to convert the fourth information into a sound signal and output the sound signal as the output sound signal, wherein the adaptive filter is configured to perform an adaptation operation assuming that the fourth information is an error, wherein said remote control system further comprises:

a vehicle system installed in a vehicle; and a control system configured to control the vehicle remotely, wherein the vehicle system includes:

a microphone configured to pick up a sound in which a sound to be heard and noise are mixed, and output a monitoring sound signal; and a transmitter configured to transmit the monitoring sound signal output from the microphone to the control system, wherein the control system includes:

a receiver configured to receive the monitoring sound signal from the vehicle system;

a speaker; and the audio signal processing device, and wherein the monitoring sound signal received by the receiver is input to the audio signal processing device as the input sound signal, and the output sound signal is output from the audio signal processing device to the speaker.

7. The remote control system according to claim 6, wherein the composite sound signal is formed with the pure tones of the plurality of frequencies extracted at predetermined frequency intervals from the frequency band to be cancelled.

8. The remote control system according to claim 6, wherein the frequency-domain information is a Fourier coefficient, wherein the first conversion circuit is a fast Fourier transform circuit configured to convert the input sound signal into the first information by performing a fast Fourier transform, and wherein the second conversion circuit is an inverse fast Fourier transform circuit configured to convert the fourth information into the output sound signal by performing an inverse fast Fourier transform.

9. The remote control system according to claim 6, wherein the frequency-domain information is a wavelet transform coefficient, wherein the first conversion circuit is a wavelet transform circuit part configured to convert the input sound signal into the first information by performing a wavelet transform, and wherein the second conversion circuit is an inverse wavelet transform circuit part is configured to convert the fourth information into the output sound signal by performing an inverse wavelet transform.

* * * * *